US008935211B2

(12) United States Patent
Orenstein et al.

(10) Patent No.: US 8,935,211 B2
(45) Date of Patent: *Jan. 13, 2015

(54) METADATA MANAGEMENT FOR FIXED CONTENT DISTRIBUTED DATA STORAGE

(75) Inventors: Jack A. Orenstein, Needham, MA (US); David E. Chavez, Amesbury, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,118

(22) Filed: Jul. 21, 2012

(65) Prior Publication Data

US 2013/0036088 A1 Feb. 7, 2013

Related U.S. Application Data

(63) Continuation of application No. 12/697,331, filed on Feb. 1, 2010, now Pat. No. 8,229,893, and a continuation of application No. 11/190,402, filed on Jul. 27, 2005, now Pat. No. 7,657,581.

(60) Provisional application No. 60/592,075, filed on Jul. 29, 2004.

(51) Int. Cl.
*G06F 17/00* (2006.01)
*G06F 17/30* (2006.01)

(52) U.S. Cl.
CPC .................................... *G06F 17/30* (2013.01)
USPC ......................................................... 707/646

(58) Field of Classification Search
USPC ......................................................... 707/646
See application file for complete search history.

(56) References Cited

U.S. PATENT DOCUMENTS

| | | | | |
|---|---|---|---|---|
| 5,878,409 A | * | 3/1999 | Baru et al. | 1/1 |
| 6,035,412 A | * | 3/2000 | Tamer et al. | 714/6.3 |
| 6,704,884 B1 | * | 3/2004 | Shepherd et al. | 714/4.1 |
| 6,711,663 B2 | * | 3/2004 | Lai et al. | 711/206 |
| 6,807,632 B1 | * | 10/2004 | Carpentier et al. | 713/165 |
| 7,509,645 B2 | * | 3/2009 | Coates et al. | 718/105 |
| 2002/0083366 A1 | * | 6/2002 | Ohran | 714/13 |
| 2003/0061456 A1 | * | 3/2003 | Ofek et al. | 711/162 |
| 2004/0030727 A1 | * | 2/2004 | Armangau et al. | 707/200 |
| 2004/0117345 A1 | * | 6/2004 | Bamford et al. | 707/1 |
| 2004/0123031 A1 | * | 6/2004 | Kiselev et al. | 711/114 |

* cited by examiner

*Primary Examiner* — Cam Truong
(74) *Attorney, Agent, or Firm* — Mattingly & Malur, PC

(57) ABSTRACT

An archival storage cluster of symmetric nodes includes a metadata management system that organizes metadata objects. Each metadata object may have a unique name, and metadata objects are organized into regions. A region is selected by hashing one or more object attributes and extracting a given number of bits of the resulting hash value. The number of bits may be controlled by a configuration parameter. Each region is stored redundantly. A region comprises a set of region copies. In particular, there is one authoritative copy of the region, and zero or more backup copies. The number of backup copies may be controlled by a configuration parameter. Region copies are distributed across the nodes of the cluster to balance the number of authoritative region copies per node, and the number of total region copies per node. Backup region copies are maintained synchronized to their associated authoritative region copy.

28 Claims, 3 Drawing Sheets

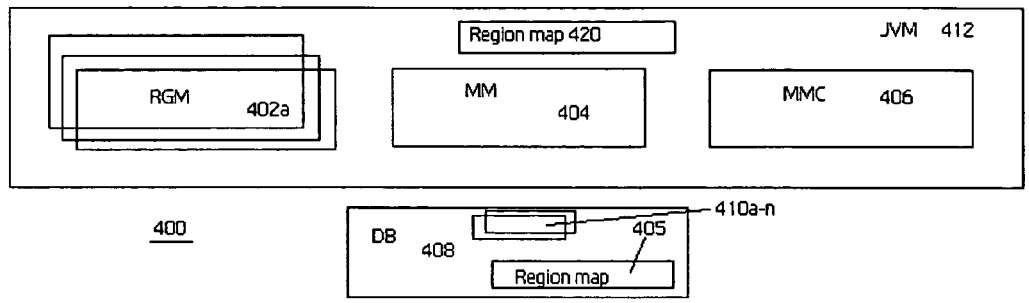
Figure 4
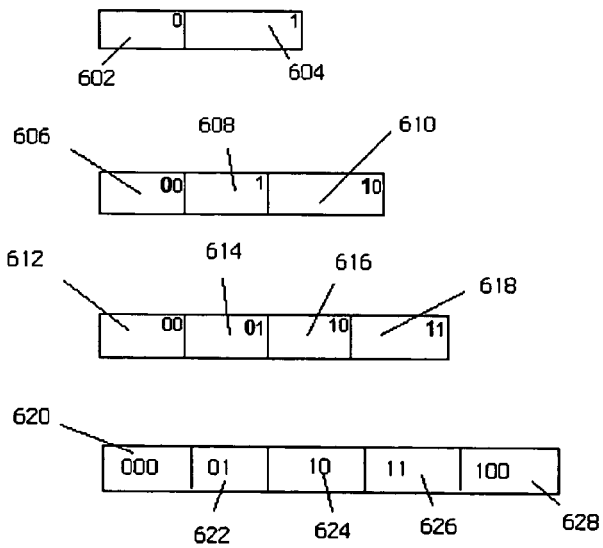
Figure 5
Figure 6

METADATA MANAGEMENT FOR FIXED CONTENT DISTRIBUTED DATA STORAGE

This application is based on and claims priority from application Ser. No. 12/697,331, filed Feb. 1, 2010, now U.S. Pat. No. 8,299,893, which application was a continuation of application Ser. No. 11/190,402, filed Jul. 27, 2005, now U.S. Pat. No. 7,657,581, which application was based on and claimed priority to Ser. No. 60/592,075, filed Jul. 29, 2004.

CROSS-REFERENCE TO RELATED APPLICATIONS

This application also is related to the following applications:

Ser. No. 10/974,443, filed Oct. 27, 2004, now U.S. Pat. No. 7,155,466; and

Ser. No. 11/638,252, filed Dec. 13, 2006, now U.S. Pat. No. 7,657,586.

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Prior art archival storage systems typically store metadata for each file as well as its content. Metadata is a component of data that describes the data. Metadata typically describes the content, quality, condition, and other characteristics of the actual data being stored in the system. In the context of distributed storage, metadata about a file includes, for example, the name of the file, where pieces of the file are stored, the file's creation date, retention data, and the like. While reliable file storage is necessary to achieve storage system reliability and availability of files, the integrity of metadata also is an important part of the system. In the prior art, however, it has not been possible to distribute metadata across a distributed system of potentially unreliable nodes. The present invention addresses this need in the art.

BRIEF SUMMARY OF THE INVENTION

An archival storage cluster of preferably symmetric nodes includes a metadata management system that organizes and provides access to given metadata, preferably in the form of metadata objects. Each metadata object may have a unique name, and metadata objects are organized into regions. Preferably, a region is selected by hashing one or more object attributes (e.g., the object's name) and extracting a given number of bits of the resulting hash value. The number of bits may be controlled by a configuration parameter. Each region is stored redundantly. A region comprises a set of region copies. In particular, there is one authoritative copy of the region, and zero or more backup copies. The number of backup copies may be controlled by a configuration parameter, which is sometimes referred to herein as a number of "tolerable points of failure" (TPOF). Thus, in a representative embodiment, a region comprises an authoritative region copy and its TPOF backup copies. Region copies are distributed across the nodes of the cluster so as to balance the number of authoritative region copies per node, as well as the number of total region copies per node.

According to a feature of the present invention, a region "map" identifies the node responsible for each copy of each region. The region map is accessible by the processes that comprise the metadata management system. A region in the region map represents a set of hash values, and the set of all regions covers all possible hash values. As noted above, the regions are identified by a number, which is derived by extracting a number of bits of a hash value. A namespace partitioning scheme is used to define the regions in the region map and to control ownership of a given region. This partitioning scheme preferably is implemented in a database.

A region copy has one of three states: "authoritative," "backup" and "incomplete." If the region copy is authoritative, all requests to the region go to this copy, and there is one authoritative copy for each region. If the region copy is a backup (or an incomplete), the copy receives update requests (from an authoritative region manager process). A region copy is incomplete if metadata is being loaded but the copy is not yet synchronized (typically, with respect to the authoritative region copy). An incomplete region copy is not eligible for promotion to another state until synchronization is complete, at which point the copy becomes a backup copy.

According to the invention, a backup region copy is kept synchronized with the authoritative region copy. Synchronization is guaranteed by enforcing a protocol or "contract" between an authoritative region copy and its TPOF backup copies when an update request is being processed. For example, after committing an update locally, the authoritative region manager process issues an update request to each of its TPOF backup copies (which, typically, are located on other nodes). Upon receipt of the update request, in this usual course, a region manager process associated with a given backup copy issues, or attempts to issue, an acknowledgement. The acknowledgement does not depend on whether the process has written the update to its local database. The authoritative region manager process waits for acknowledgements from all of the TPOF backup copies before providing an indication that the update has been successful. There are several ways, however, in which this update process can fail, e.g., the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. If the backup region manager cannot process the update, it removes itself from service. If either the backup region manager process or the authoritative manager process die, a new region map is issued. By ensuring synchronization in this manner, each backup copy is a "hot standby" for the authoritative copy. Such a backup copy is eligible for promotion to being the authoritative copy, which may be needed if the authoritative region copy is lost, or because load balancing requirements dictate that the current authoritative region copy should be demoted (and some backup region copy promoted).

This design ensures high availability of the metadata even upon a number of simultaneous node failures.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates components of the metadata management system on a given node of the cluster;

FIG. 5 is an illustrative region map; and

FIG. 6 illustrates how a namespace partitioning scheme is used to facilitate region map changes as the cluster grows in size.

DETAILED DESCRIPTION OF AN ILLUSTRATIVE EMBODIMENT

Figure 1:
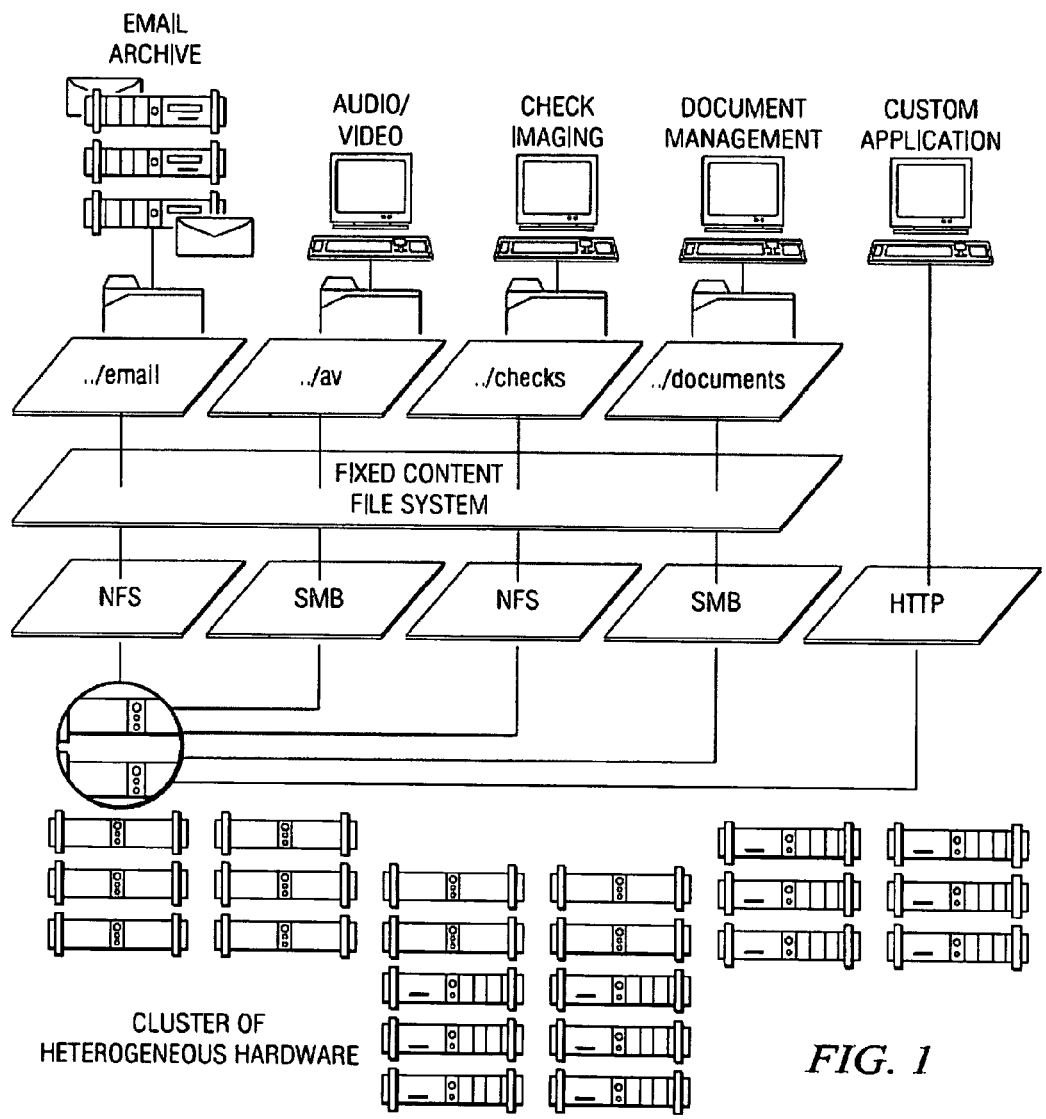
FIG. 1 is a simplified block diagram of a fixed content storage archive in which the present invention may be implemented.

The present invention preferably is implemented in a scalable disk-based archival storage management system, preferably a system architecture based on a redundant array of independent nodes. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. In one illustrative embodiment, the software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
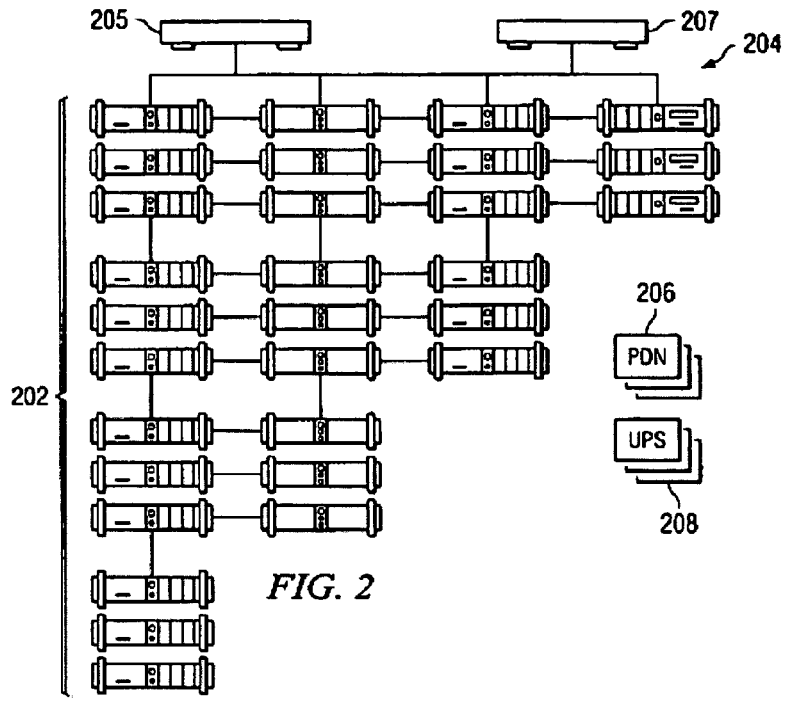
FIG. 2 is a simplified representation of a redundant array of independent nodes each of which is symmetric and supports an archive cluster application according to the present invention.

As described in commonly-owned U.S. Pat. No. 7,155, 466, a distributed software application executed on each node captures, preserves, manages, and retrieves digital assets. In an illustrated embodiment of FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the cluster so that the archive is always protected from device failure. If a disk or node fails, the cluster automatically fails over to other nodes in the duster that maintain replicas of the same data.

An illustrative cluster preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system.

Each drive in a given node preferably has its own storage manager. This allows the node to remove individual drives and to optimize throughput. The storage manager 330 also provides system information, integrity checks on the data, and the ability to traverse local directly structures.

Figure 3:
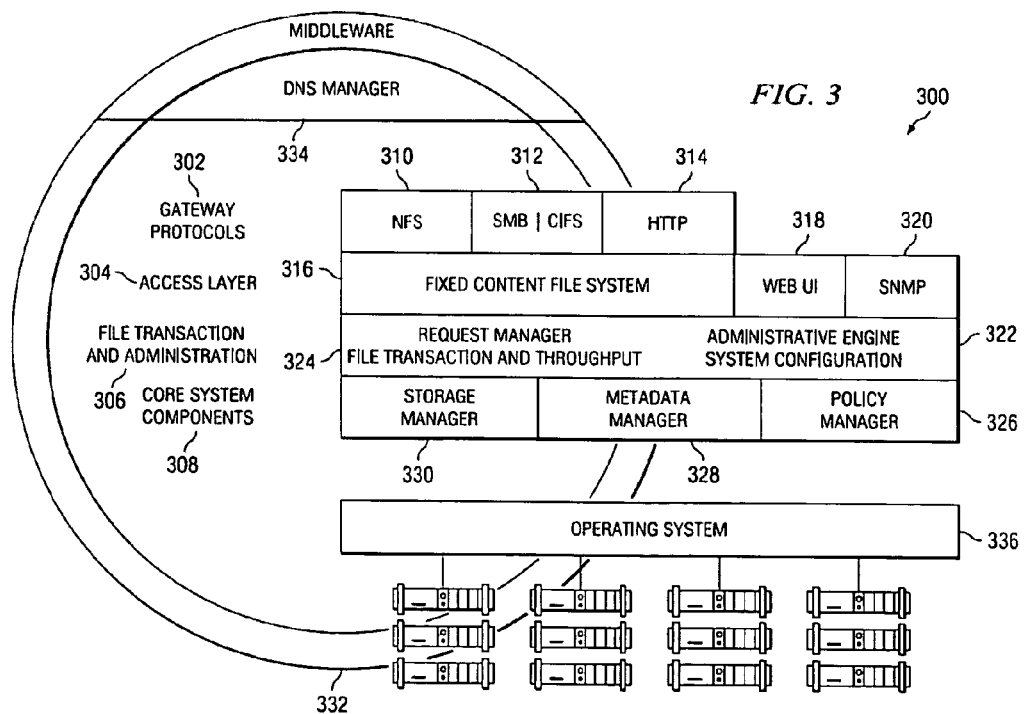
FIG. 3 is a high level representation of the various components of the archive cluster application executing on a given node.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0. The communications middleware is any convenient distributed communication mechanism. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

As noted above, internal files preferably are the "chunks" of data representing a portion of the original "file" in the archive object, and preferably they are placed on different nodes to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

Metadata Management

According to the present invention, a metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types:

ExternalFile: a file as perceived by a user of the archive;
InternalFile: a file stored by the Storage Manager; typically, there may be a one-to-many relationship between External Files and Internal Files.
ConfigObject: a name/value pair used to configure the cluster;
AdminLogEntry: a message to be displayed on the administrator UI;
MetricsObject: a timestamped key/value pair, representing some measurement of the archive (e.g. number of files) at a point in time; and
PolicyState: a violation of some policy.

Of course, the above objects are merely illustrative and should not be taken to limit the scope of the present invention.

Each metadata object may have a unique name that preferably never changes. According to the invention, metadata objects are organized into regions. A region comprises an authoritative region copy and a TPOF number (a set of zero or more) backup region copies. With zero copies, the metadata management system is scalable but may not be highly available. A region is selected by hashing one or more object attributes (e.g., the object's name, such as a fully-qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme, as will be described in more detail below.

Each region may be stored redundantly. As noted above, there is one authoritative copy of the region, and zero or more backup copies. The number of backup copies is controlled by the metadataTPOF (or "TPOF") configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

As illustrated in FIG. 4, each node 400 has a set of processes or components: one or more region managers (RGM) 402*a-n*, a metadata manager (MM) 404, at least one metadata manager client (MMC) 406, and a database 408 having one or more schemas 410*a-n*. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. According to the invention, and as will be described, each node preferably has the same global view of the region map, which requirement is enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, which should not be taken to limit the present invention, each metadata object has an attribute (e.g., a name), which is hashed to yield an integer between 0x0 and 0x3fffffff inclusive, i.e. 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM die, a new region map is issued.

To prove that synchronization is maintained, several potential failure scenarios are now explained in more detail. In a first scenario, assume that each backup RGM, after acknowledging the update request, successfully carries out the request locally in its associated database. In this case, the authoritative and backup schemas are in sync. In a second scenario, assume that the authoritative RGM encounters an exception (e.g., a Java IOException) from a backup RGM. This means that the backup RGM may have failed. In such case, the authoritative RGM requests that the MM leader send out a new map, or the MM leader, noticing that the backup node has failed, initiates creation of a new map on its own. (A "new map" may also be simply an updated version of a current map, of course). As part of this process, the interrupted update, which is still available from the authoritative RGM, will be applied to remaining backup region copies, and to a new incomplete region copy. In a third scenario, assume that the backup RGM encounters an exception while acknowledging the backup request to the authoritative RGM. This means that the authoritative RGM may have failed. In this case, because it noticed the failure of the node containing the authoritative region copy, the MM leader sends out a new map. If the update was committed by any backup RGM, then that update will be made available to all region copies when the new map is distributed. This may result in a false negative, as the update is reported to the caller as a failure, yet the update actually succeeded (which is acceptable behavior, however). If the update has not been committed by any backup RGM, then the update is lost. The update is reported to the caller as a failure. In a fourth scenario, assume a backup RGM fails to process the backup request after acknowledging receipt. In this case, as noted above, the backup RGM shuts itself down when this occurs. To guarantee this, a shutdown is implemented upon the occurrence of an unexpected event (e.g., Java SQLException, or the like). This ensures that a backup region goes out of service when it cannot guarantee synchronization. In such case, the normal map reorganization process creates a new, up-to-date backup copy of the region on another node. The update has been committed in at least the authoritative region copy, so that the new backup region copy will be synchronized with the authoritative region copy. In a fifth scenario, assume that the authoritative RGM crashes even before it perform the local commit. In such case, of course, there is no metadata update and the request fails.

The above scenarios, which are not exhaustive, illustrate how the present invention guarantees synchronization between the authoritative region copy and its TPOF backup copies.

As has been described, the region map describes the ownership of each copy of each region. For example, FIG. 5 illustrates a region map for a 4-node cluster with metadataTPOF=2. In this example, node 1 is authoritative for region 0, and nodes 2 and 3 have been designated as backups, node 2 is authoritative for region 1, and nodes 3 and 4 have been designated as backups; and so on, as indicated. According to the present invention, a namespace partitioning scheme is used to change control (ownership) of a particular region as the cluster grows. One way to allow dynamic growth is to increment the regionMapLevel configuration parameter that determines the number of bits that comprise the hash value number. As the cluster grows, one or more partitions of the region map undergo a "split" operation. Splitting involves using one more bit of the hash value and redistributing metadata accordingly. For example, consider a map at level 6, and two metadata objects with hash values 0x1000002a and 0x1000006a. The last 6 bits of these hash values (hex 0x2a, with "2" being binary "0010" and "6" being binary "0110") are the same; thus, both objects fall into region 0x2a. If the map level is then increased to 7, then the regions are 0 through 0x7f, thus forcing the two objects to go into different regions, namely, 0x2a and 0x6a.

While this approach may be used, it requires every region to be split at the same time. A better technique is to split regions incrementally. To do this, the namespace partitioning scheme splits regions in order, starting at region 0 and ending at the last region of the current level. A region is split by using one more bit of the hash value. FIG. 6 illustrates this process. In this example, assume that at a map level 1 there are two regions 602 (node 0) and 604 (node 1). The nodes numbers are shown in binary. When the map needs to grow, the partitioning scheme splits region 0 by using one more bit of the hash value. This creates three regions 606, 608 and 610. The objects whose new bit is zero stay where they are in region 606 (node 00), and the remaining objects go to a new last region 610 (node 10). The bits added due to the split are italicized, namely: 00 and 10. It should be noted that the first and last regions 606 and 610 use two bits, while the middle (unsplit) region uses just one; yet, the numbering scheme still works correctly, namely, {0,1,2}, when viewed from left to right. For further growth, region 1 is split to create four regions 612 (node 00), 614 (node 01), 616 (node 10) and 618 (node 11). This completes level 2. When the region map needs to grow again, the scheme splits region 00 to 000 (i.e., by adding one more bit of the hash value) and adds a new region 100 (also by adding one more bit of the hash value), at the end. The region map then has five regions 620, 622, 624, 626 and 628 as shown.

There is no requirement that the number of regions correspond to the number of nodes. More generally, the number of regions is uncorrelated with the number of nodes in the array of independent nodes.

Thus, according to one embodiment, control over regions is accomplished by assigning metadata objects to regions and then splitting regions incrementally. The region copies (whether authoritative, backup or incomplete) are stored in the database on each node. As has been described, metadata operations are carried out by authoritative RGMs. When a node fails, however, some number of region copies will be lost. As has been described, availability is restored by promoting one of the backup copies of the region to be authoritative, which can usually be done in a few seconds. During the short interval in which the backup is promoted, requests submitted by an MMC to the region will fail. This failure shows up as an exception caught by the MMC, which, after a delay, causes a retry. By the time the request is retried, however, an updated map should be in place, resulting in uninterrupted service to MMC users. As has been described, this approach relies on copies (preferably all of them) of a region staying synchronized.

Thus, the metadata management system keeps copies of a region synchronized. An update that is done to an object in the authoritative region copy is replicated on the backup region copies. Once an update is committed by the authoritative RGM, the same update is applied to all backup region copies. By contrast, in a general-purpose distributed database, different updates may occur at different sites, and it is possible for some update sites, but not others, to run into problems requiring rollback. In the present invention, within a copy of a region, requests preferably are executed in the same order as in all other copies, one at a time. It is not necessary to abort a transaction, e.g., due to deadlock or due to an optimistic locking failure. Typically, the only reason for request execution to fail is a failure of the node, e.g. a disk crash, the database runs out of space, or the like. The metadata management system, however, ensures that any such failure (whether at the node level, the region manager level or the like) causes reassignment of region copies on the failed node; thus, the integrity of the remaining region copies is guaranteed. As will be described in more detail below, according to the invention, if a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

The following section provides additional detail on maintaining backup regions according to the present invention.

As already noted, the backup scheme relies on one or more (and preferably all) of the backup copies of a region staying synchronized such that each backup copy is a "hot standby." Backup regions are maintained as follows. A metadata object is created or modified by sending a request to an authoritative RGM. Request execution typically proceeds as follows:
    update local database
    commit database update
    for each backup region manager:
    send backup request to backup region manager
    wait for acknowledgement of backup request
    return control to caller There is no timeout specified for the backup request. An exception from a backup RGM indicates that the remote node has failed. The administrative engine notices this exception and informs the MM leader of the failure. This causes a new incomplete region copy to be created elsewhere. A new region map describing that incomplete region copy is then distributed. The authoritative RGM, therefore, can ignore the exception.

The receiver of a backup request acknowledges the request and then applies the requested updates to its local database. A last received backup request is kept in memory for use in recovering a backup region. Only the last request is needed, so when a new backup request is received and committed, the previous one may be discarded.

For a backup region copy to be used as a hot standby, it must be kept synchronized with the authoritative region copy. As has been described, the scheme provides a way to synchronize with the most recent update before any promotion of a region copy (from backup to authoritative). Thus, after acknowledging receipt of a backup request (if it can), the backup RGM either commits the update to the local database or removes itself from service. In an illustrative embodiment, the backup RGM can remove itself from service by bringing down a given process, such as a JVM, or by bringing down just the region. Thus, according to the scheme, if a backup RGM exists, it is synchronized with the authoritative RGM.

The following provides additional implementation details of the metadata management system of the present invention.

Intra- and inter-node communications may be based on a one-way request pattern, an acknowledged request pattern, or a request/response pattern. In a one-way request pattern, a request is sent to one or multiple receivers. Each receiver executes the request. The sender does not expect an acknowledgement or response. In an acknowledged request pattern, a request is sent to one or more receivers. Each receiver acknowledges receipt and then executes the request. In a request/response pattern, a request is sent to one or more receivers. Each executes the request and sends a response to the sender. The responses are combined, yielding an object summarizing request execution. The acknowledged request pattern is used to guarantee that backup region copies are correct. These communication patterns are used for various component interactions between the MMC and RGM, between RGMS, between MMs, and between system components and an MMC.

As mentioned above, the MM leader creates a region map when a node leaves the cluster, when a node joins the cluster, or when an incomplete region copy completes loading. In the first case, when a node leaves a cluster, either temporarily or permanently, the regions managed by the MM on that node have to be reassigned. The second case involves the situation when a node returns to service, or when a node joins the cluster for the first time; in such case, regions are assigned to it to lighten the load for the other MMs in the cluster. All the regions created on the new node are incomplete. These regions are promoted to be backups once they have finished loading data. The third situation occurs when an incomplete region completes loading its data. At this time, the region becomes a backup. A map creation algorithm preferably ensures that a given node never contains more than one copy of any region, that authoritative regions are balanced across the cluster, and that all regions are balanced across the cluster. The latter two constraints are necessary, as all RGMs process every metadata update and thus should be spread across the cluster. Authoritative RGMs also process retrieval requests, so they should also be well-distributed.

The following provides additional details regarding a map creation algorithm.

When a MM leader needs to create a new map, the first thing it does is a region census. This is done using the request/response message pattern, sending the request to the MM on each node currently in the cluster. The request/response pattern preferably includes an aggregation step in which all responses are combined, forming a complete picture of what regions exist in the archive. The information provided by the region census preferably includes the following, for each region copy: the node owning the region copy, the last update processed by the region manager (if any), and the region timestamp stored in the region's database schema. The region timestamps are used to identify obsolete regions, which are deleted from the census. This guarantees that obsolete regions will be left out of the map being formed, and also that the obsolete region schemas will be deleted. In most cases, an obsolete region copy will have a lower map version number than the map number from a current region copy. This may not always be the case, however. Assume, for example, that a new map is being created due to a node crash. The region census discovers the remaining regions and forms a new map. If the failed node restarts in time to respond to the region census, the node will report its regions as if nothing had gone wrong. However, these regions may all be out of date due to updates missed while the node was down. The solution to this problem is to examine the region timestamps included with the region census. Each region copy reports its region timestamp, which represents the timestamp of the last update processed. Suppose the maximum timestamp for a region is (v, u). Because region copies are kept synchronized, valid timestamps are (v, u) and (v, u−1). This identifies obsolete regions, whether the failed region has a current or obsolete map version number. There is no danger that a node will fail, return to service quickly, and then start processing requests based on obsolete regions. The reason for this is that the node will not have a region map on reboot, and RGMs do not exist until the map is received. Requests from an MMC cannot be processed until RGMs are created. So a failed node, which restarts quickly, cannot process requests until it gets a new map, and the new map will cause the node to discard its old regions.

After the region census, an initial region map is generated as follows. If the region census turns up no regions at all, then the cluster must be starting for the first time. In this case, authoritative region owners are assigned first. For each assignment, the algorithm selects a least busy node. The least busy node is the node with the fewest region copies. Ties are resolved based on the number of authoritative copies owned. After authoritative region owners are assigned, backup region owners are assigned, striving to balanced authoritative and total region ownership. The new map is sent to all MMs, which then create the regions described by the map.

Once the cluster has started, map changes preferably are implemented by doing the following map transformations, in order: (1) if a region does not have an authoritative copy (due to a node failure), promote a backup; (2) if a region has more than TPOF backups, delete excess backups; (3) if a region has fewer than TPOF backups, (due to a node failure, or due to a promotion to authoritative), create a new incomplete region copy; (4) rebalance ownership; and (5) rebalance authoritative ownership. Step (4) involves finding the busiest node and reassigning one of its regions to a node whose ownership count is at least two lower. (If the target node's ownership count is one lower, then the reassignment does not help balance the workload.) Preferably, this is done by creating a new incomplete region. This operation is continued as long as it keeps reducing the maximum number of regions owned by any node. Step (5) involves finding the node owning the largest number of authoritative regions, and finding a backup whose authoritative ownership count is at least two lower. This step swaps responsibilities, e.g., by promoting the backup and demoting the authoritative. This operation is continued as long as it keeps reducing the maximum number of authoritative regions owned by any node.

When a node leaves the cluster, then steps (1) and (3) fill any gaps in the region map left by the node's departure. Steps (4) and (5) are then used to even out the workload, if necessary.

When a node joins the cluster, steps (1)-(3) do not change anything. Step (4), in contrast, results in a set of incomplete regions being assigned to the new node. When an incomplete region completes loading its data, it notifies the MM leader. The map promotes the incomplete region to a backup. Step (5) then has the effect of assigning authoritative regions to the new node.

When an incomplete region finishes its synchronization, it converts to a backup region and informs the MM leader. The MM leader then issues a new map, containing more than TPOF backups for at least one region. Step (2) deletes excess backup regions, opting to lighten the burden on the most heavily loaded MMs.

When a MM receives a new map, it needs to compare the new map to the current one, and for each region managed by the MM, apply any changes. The possible changes are as follows: delete a region, create a region, promote a backup region to authoritative, promote an incomplete region to backup, and demote an authoritative region to backup. Regarding the first type of change, load balancing can move control of a region copy from one node to another, resulting in deletion of a copy. In such case, the network and database resources are returned, including the deletion of the schema storing the region's data. The second type of change, creating a region, typically occurs in a new cluster as authoritative and backup regions are created. Thereafter, only incomplete regions are created. Region creation involves creating a database schema containing a table for each type of metadata object. Each region's schema contains information identifying the role of the region (authoritative, backup or incomplete). The third type of change, promotion from backup to authoritative, requires modification of the region's role. The other change types, as their names imply, involve changing the region's role from incomplete to backup, or from authoritative to backup.

An incomplete region starts out with no data. As noted above, it is promoted to a backup region when it is synchronized with the other copies of the region. This has to be done carefully because the region is being updated during this synchronization process. A fast way of loading large quantities of data into a Postgres database is to drop all indexes and triggers, and then load data using a COPY command. In a representative embodiment, one complete procedure is as follows: (1) create an empty schema; (2) for each table, use two COPY commands, connected by a pipe; the first COPY extracts data from a remote authoritative region, the second one loads the data into the local incomplete region; (3) add triggers (to maintain external file metrics); and (4) add indexes. Like a backup region, an incomplete region is responsible for processing backup requests. A backup region implements these requests by updating the database. An incomplete region cannot do this due to the lack of triggers and indexes. Instead, the backup requests are recorded in the database. Once the data has been loaded and the triggers and indexes have been restored, the accumulated update requests are processed. More updates may arrive as the update requests are being processed; these requests are en-queued and are processed also. At a given point, incoming requests are blocked, the queue is emptied, and the region switches over to processing backup requests as they come in. Once this switch occurs, the region announces to the MM leader that it can be promoted to a backup region.

Some interactions between MM components have to be carefully synchronized as will now be described.

A map update must not run concurrently with request execution as it can lead to a temporarily incorrect view of the metadata. For example, suppose an update request arrives at an RGM just as the RGM is being demoted from authoritative to backup. The request could begin executing when the demotion occurs. There will be a local update, and then backup requests will be issued. The RGM, however, will receive its own backup request (which is incorrect behavior), and the new authoritative region will receive the backup request. Meanwhile, a request for the object could go to the new authoritative region before the backup request had been processed, resulting in an incorrect search result. As another example, when an incomplete region is loading its data, backup requests are saved in a queue in the database. When the load is complete, the en-queued requests are processed. Once they have all been processed, update requests are processed as they are received. The switch from executing accumulated requests to executing requests as they arrive must be done atomically. Otherwise, updates could be lost. These problems are avoided by creating a lock for each RGM, and preferably the execution of each request by an RGM is protected by obtaining the RGM's lock.

The present invention provides numerous advantages. Each metadata manager of a node controls a given portion of the metadata for the overall cluster. Thus, the metadata stored in a given node comprises a part of a distributed database (of metadata), with the database being theoretically distributed evenly among all (or a given subset of) nodes in the cluster. The metadata managers cooperate to achieve this function, as has been described. When new nodes are added to the cluster, individual node responsibilities are adjusted to the new capacity; this includes redistributing metadata across all nodes so that new members assume an equal share. Conversely, when a node fails or is removed from the cluster, other node metadata managers compensate for the reduced capacity by assuming a greater share. To prevent data loss, metadata information preferably is replicated across multiple nodes, where each node is directly responsible for managing some percentage of all cluster metadata, and copies this data to a set number of other nodes.

When a new map is generated, the MM leader initiates a distribution of that map to the other nodes and requests suspension of processing until all nodes have it. Ordinary processing is resumed once the system confirms that all of the nodes have the new map.

The present invention facilitates the provision of an archive management solution that is designed to capture, preserve, manage, and retrieve digital assets. The design addresses numerous requirements: unlimited storage, high reliability, self-management, regulatory compliance, hardware independence, and ease of integration with existing applications. Each of these requirements is elaborated below.

Clusters of commodity hardware running Linux (for example) provide a robust platform and a virtually unlimited archive. The system can scale, e.g., from a few storage node servers to many nodes that store thousands of terabytes of data. The unique architecture ensures that storage capacity can always keep pace with an organization's increasing archive requirements.

The system is designed never to lose a file. It replicates data across the cluster so that the archive is always protected from device failure. If a disk or node fails, the cluster automatically fails over to other nodes in the cluster that maintain replicas of the same data.

The present invention reduces the cost of archive storage through autonomous processing. For example, as nodes join or leave the clustered archive, the system automatically adjusts the cluster's load balance and optimizes performance by redistributing files across member nodes.

The present invention can help enterprise with government and industry regulations or the long-term retention of records such as financial documents and medical data. This advantage is provided by implementing write-once-read-many (WORM) guarantees, as well as time-stamping, which facilitates compliance with customer-defined retention policies.

The present invention eliminates hardware dependencies by deploying on an open platform. As the cost gap between commodity platforms and proprietary storage devices grows, IT buyers no longer want to be locked into relationships with high-cost appliance vendors. Because a given node typically runs on commodity hardware and preferably open source (e.g., Linux) operating system software, preferably buyers can shop among many hardware options for the best solution.

The present invention offers industry-standard interfaces such as NFS, HTTP, FTP, and CIFS to store and retrieve files. This ensures that the system can easily interface to most standard content management systems, search systems, storage management tools (such as HSM and backup systems), as well as customized archive applications.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A method for a system including a plurality of nodes which store a content data by associating with a metadata object, the method comprising the steps of:
   generating a map that identifies a node that stores an authoritative copy of a region for the metadata object, and zero or more nodes that store zero or more backup copies of the region for the metadata object, the number of the backup copies being determined based on a metadata tolerable points of failure (TPOF) configuration parameter;
   distributing the map across the plurality of nodes so that each node can identify a location of the authoritative copy or backup copy;
   after a state of the authoritative copy or the backup copy is changed, updating the map to reflect the change of the state;
   distributing the updated map across the plurality of nodes; and
   processing an access to the metadata object on each node of the plurality of nodes by referring to the distributed map.

2. The method as described in claim 1, further comprising the steps of:
   executing a region census to identify what copies of the region for the metadata object are stored in each node of the nodes, and
   removing an obsolete copy of the region for the metadata object from the updated map.

3. The method as described in claim 1, further comprising the step of:
   issuing an update request to the node that stores the backup copy when updating the authoritative copy of the region for the metadata object.

4. The method as described in claim 1, further comprising the step of:
   when the location of the authoritative copy or the backup copy is changed, further updating the map to reflect change of the location.

5. The method as described in claim 1, further comprising the step of:
   further updating the map upon one of: a new authoritative copy of the region for the metadata object is created in a node, a new backup copy of the region for the metadata object is created in the node, the authoritative copy of the region for the metadata object is deleted, and the backup copy of the region for the metadata object is deleted.

6. The method as described in claim 1, wherein the state of the authoritative copy is changed by demoting the authoritative copy to a new backup copy, and the state of the backup copy is changed by promoting the backup copy to a new authoritative copy.

7. A system, comprising:
   a plurality of nodes which store a content data by associating with a metadata object;
   a network that couples the plurality of nodes;
   a manager component executed on a hardware element on one of the nodes and configured to:
   generate a map that identifies a node that stores an authoritative copy of a region for the metadata object, and zero or more nodes that store zero or more backup copies of the region for the metadata object, the number of the backup copies being determined based on a metadata tolerable points of failure (TPOF) configuration parameter;
   distribute the map across other nodes so that each node of the plurality of nodes identifies a location of the authoritative copy or backup copy;
   update the map to reflect a change of state after the state of the authoritative copy or the backup copy is changed; and
   distribute the updated map to the plurality of nodes.

8. The system as described in claim 7, wherein the manager component is further configured to:

execute a region census to identify what copies of the region for the metadata object are stored in each node of the nodes, and remove an obsolete copy of the region for the metadata object from the updated map.

9. The system as described in claim 7, wherein the node that stores the authoritative copy is configured to issue an update request to the node that stores the backup copy when updating the authoritative copy of the region for the metadata object.

10. The system as described in claim 7, wherein the manager component is further configured to:

further update the map to reflect a change of location when the location of the authoritative copy or the backup copy is changed.

11. The system as described in claim 7, wherein the manager component is further configured to:

update the map upon one of: a new authoritative copy of the region for the metadata object is created in a node, a new backup copy of the region for the metadata object is created in the node, the authoritative copy of the region for the metadata object is deleted, and the backup copy of the region for the metadata object is deleted.

12. The system as described in claim 7, wherein the plurality of authoritative copies and the plurality of backup copies are distributed across the plurality of nodes to balance a number of authoritative copies or backup copies per node.

13. The system as described in claim 7, wherein the plurality of authoritative copies and the plurality of backup copies are distributed across the plurality of nodes to balance a number of authoritative copies or backup copies per node, and to balance a total number of authoritative copies and backup copies per node.

14. The system as described in claim 7, wherein the state of the authoritative copy is changed by demoting the authoritative copy to a new backup copy, and the state of the backup copy is changed by promoting the backup copy to a new authoritative copy.

15. A system comprising:

a plurality of nodes which store a content data by associating with a metadata object;

a network that couples the plurality of nodes;

wherein one of the nodes is configured to generate a map that identifies a node that stores an authoritative copy of a region for the metadata object and zero or more nodes that store zero or more backup copies of the region for the metadata object, the number of the backup copies being determined based on a metadata tolerable points of failure (TPOF) configuration parameter, and to distribute the map across other nodes so that each node of the plurality of nodes identifies a location of the authoritative copy and backup copy; and wherein when the location of the authoritative copy or the backup copy is changed, the one of the nodes is configured to update the map to reflect the change of the location on the map and to distribute the updated map to the plurality of nodes.

16. The system as described in claim 15, wherein the one of the nodes is further configured to execute a region census to identify what copies of the region for the metadata object are stored in each node, and to remove an obsolete copy of the region for the metadata object from the updated map.

17. The system as described in claim 15, wherein the node that stores the authoritative copy is configured to issue an update request to the node that stores the backup copy when updating the authoritative copy of the region for the metadata object.

18. A system, comprising:

a plurality of nodes which store a content data by associating with a metadata object;

a network that couples the plurality of nodes;

wherein one of the nodes is configured to generate a map that identifies a node that stores an authoritative copy of a region for the metadata object and zero or more nodes that store zero or more backup copies of the region for the metadata object, the number of backup copies being determined based on a metadata tolerable points of failure (TPOF) configuration parameter, and to distribute the map across other nodes so that each node of the plurality of nodes identifies a location of the authoritative copy and backup copy; and wherein one of the nodes is configured to update the map upon one of: a new authoritative copy of the region for the metadata object is created, a new backup copy of the region is created, an authoritative copy of the region for the metadata object is deleted, and the backup copy of the region for the metadata object is deleted;

wherein the one of the nodes that updates the map distributes the updated map to the plurality of nodes.

19. The system as described in claim 18, wherein the one of the nodes is further configured to execute a region census to identify what copies of the region for the metadata object are stored in each node, and to remove an obsolete copy of the region for the metadata object from the updated map.

20. The system as described in claim 18, wherein the node that stores the authoritative copy is configured to issue an update request to the node that stores the backup copy when updating the authoritative copy of the region for the metadata object.

21. A system comprising:

a plurality of nodes which store a data by associating with a metadata object; and a network that couples the plurality of nodes;

wherein one of the nodes is configured to generate a map that identifies a node that stores an authoritative copy of a region for the metadata object and zero or more nodes that store zero or more backup copies of the region for the metadata object, the number of the backup copies being determined based on a metadata tolerable points of failure (TPOF) configuration parameter, and to distribute the map across other nodes so that each node of the plurality of nodes identifies a location of the authoritative copy and the backup copy; and wherein the plurality of nodes are configured to process an access to the data or the metadata object by referring to the distributed map.

22. The system as described in claim 21, wherein when the location of the authoritative copy or the backup copy is changed, the one of the nodes is configured to update the map to reflect the change of the location on the map and to distribute the updated map to the plurality of nodes.

23. The system as described in claim 22, wherein the one of the nodes is further configured to execute a region census to identify what copies of the region for the metadata object are stored in each node, and to remove an obsolete copy of the region for the metadata object from the updated map.

24. The system as described in claim 22, wherein the node that stores the authoritative copy is configured to issue an update request to the node that stores the backup copy when updating the authoritative copy of the region for the metadata object.

25. A method for a system including a plurality of nodes which store a data by associating with a metadata object, the method comprising the steps of:

generating a map that identifies a node that stores an authoritative copy of a region for the metadata object, and zero or more nodes that store zero or more backup copies of the region for the metadata object, the number of the backup copies being determined based on a metadata tolerable points of failure (TPOF) configuration parameter;

distributing the map across the plurality of nodes so that each node can identify a location of the authoritative copy or the backup copy; and processing an access to the data or the metadata object on each node of the plurality of nodes by referring to the distributed map.

26. The method as described in claim 25, further comprising the steps of:

after a state of the authoritative copy or the backup copy is changed, updating the map to reflect the change of the state; and distributing the updated map across the plurality of nodes.

27. The method as described in claim 26, further comprising the steps of:

executing a region census to identify what copies of the region for the metadata object are stored in each of the nodes, and removing an obsolete copy of the region for the metadata object from the updated map.

28. The method as described in claim 26, further comprising the step of:

issuing an update request to the node that stores the backup copy when updating the authoritative copy of the region for the metadata object.

* * * * *